(12) United States Patent
Baldwin et al.

(10) Patent No.: US 10,900,598 B2
(45) Date of Patent: Jan. 26, 2021

(54) LABYRINTH SEAL SWAGE COUPLING FOR HIGH TEMPERATURE/PRESSURE REINFORCED RUBBER HOSE AND METHODS OF ATTACHMENT

(71) Applicant: George Myer Company, Inc., Houston, TX (US)

(72) Inventors: Gardner T. Baldwin, Houston, TX (US); Victor J. DeLeon, Houston, TX (US); Phillip C. Kelly, Houston, TX (US)

(73) Assignee: George Myer Company, Inc., Houston, TX (US)

( * ) Notice: Subject to any disclaimer, the term of this patent is extended or adjusted under 35 U.S.C. 154(b) by 871 days.

(21) Appl. No.: 13/261,950

(22) PCT Filed: Mar. 1, 2013

(86) PCT No.: PCT/US2013/000055
§ 371 (c)(1),
(2) Date: Sep. 9, 2014

(87) PCT Pub. No.: WO2013/137968
PCT Pub. Date: Sep. 19, 2013

(65) Prior Publication Data
US 2015/0176735 A1    Jun. 25, 2015

Related U.S. Application Data

(60) Provisional application No. 61/796,810, filed on Nov. 20, 2012, provisional application No. 61/685,339, filed on Mar. 15, 2012.

(51) Int. Cl.
*F16L 33/207* (2006.01)
*E21B 21/02* (2006.01)
(Continued)

(52) U.S. Cl.
CPC .......... *F16L 33/2073* (2013.01); *E21B 21/01* (2013.01); *E21B 21/02* (2013.01); *B21J 5/02* (2013.01); *Y10T 29/49817* (2015.01)

(58) Field of Classification Search
CPC ....... F16L 33/2073; F16L 33/01; E21B 21/01; E21B 21/02; B21J 5/02; Y10T 29/49908;
(Continued)

(56) References Cited

U.S. PATENT DOCUMENTS 2,661,225 A   12/1953  Lyon
2,965,395 A   12/1960  Schmohl et al.
(Continued)

FOREIGN PATENT DOCUMENTS

EP   0109270 A1   5/1984
FR   2347603 A1   11/1977
(Continued)

OTHER PUBLICATIONS

"Sanitary Couplers Hose and Fittings for High-Purity and Sanitary Applications", Siant-Gobain Performance Plastics, product catalog, 2003, 48 pgs.

*Primary Examiner* — Matthew Troutman
*Assistant Examiner* — Fannie C Kee

(57) ABSTRACT

A Specialized Fitting and a Method of Manufacture for swaging hose couplings to high pressure, high temperature reinforced rubber hose having a corrugated or smooth plastic/nylon/elastomer or metal lining (inner tube). The hose couplings include a stem having first hose grippers extending from and along a length of the outer surface; elastomeric sealing members located around and disposed along a length of the outer surface of the stem; and a ferrule attached to the stem adjacent ensuring a labyrinth seal between the inner tube and the hose coupling.

4 Claims, 15 Drawing Sheets

(51) Int. Cl.
*E21B 21/01* (2006.01)
*B21J 5/02* (2006.01)

(58) Field of Classification Search
CPC ......... Y10T 29/49817; Y10T 29/49925; Y10T 29/49927
USPC .................. 29/515, 516, 521; 285/242, 256, 285/222.1–222.5, 382, 382.1, 382.2, 285/382.7
See application file for complete search history.

(56) References Cited

U.S. PATENT DOCUMENTS

| | | | |
|---|---|---|---|
| 3,347,571 A | 10/1967 | New | |
| 4,106,526 A | 8/1978 | Szentmihaly | |
| 4,212,487 A | 7/1980 | Jones et al. | |
| 4,226,446 A | 10/1980 | Burrington | |
| 4,330,142 A | 5/1982 | Paini | |
| 4,564,223 A | 1/1986 | Burrington | |
| 4,569,541 A * | 2/1986 | Eisenzimmer | F16L 33/01 156/293 |
| 4,664,424 A | 5/1987 | Smith | |
| 5,044,671 A | 9/1991 | Chisnell et al. | |
| 5,076,615 A | 12/1991 | Sampson | |
| 5,165,733 A | 11/1992 | Sampson | |
| 5,349,988 A | 9/1994 | Walsh et al. | |
| 6,378,914 B1 | 4/2002 | Quaranta | |
| 6,505,649 B1 | 1/2003 | Dixon-Roche | |
| 7,338,090 B2 * | 3/2008 | Baldwin | F16L 33/2073 285/256 |
| 8,439,405 B2 | 5/2013 | Trujillo et al. | |
| 9,212,771 B2 * | 12/2015 | Baldwin | F16L 33/2073 |
| 2003/0205898 A1 | 11/2003 | Baldwin et al. | |
| 2004/0032124 A1 * | 2/2004 | Lefere | F16L 33/2071 285/242 |
| 2006/0011249 A1 | 1/2006 | Arima et al. | |
| 2007/0157443 A1 | 7/2007 | Baldwin et al. | |
| 2008/0238090 A1 | 10/2008 | Williams | |
| 2011/0068572 A1 | 3/2011 | Nacsa et al. | |
| 2011/0272943 A1 | 11/2011 | Baldwin et al. | |
| 2014/0291981 A1 * | 10/2014 | Baldwin | F16L 33/2073 285/256 |
| 2016/0076685 A1 | 3/2016 | Baldwin et al. | |

FOREIGN PATENT DOCUMENTS

| | | |
|---|---|---|
| GB | 992378 | 5/1965 |
| WO | 2010098833 A1 | 9/2010 |
| WO | 2013019274 A1 | 2/2013 |
| WO | 2013137968 A1 | 9/2013 |

* cited by examiner

 GMCO INTERNAL HYDROSTATIC REPORT 

| | | |
|---|---|---|
| CUSTOMER: | TEST # | TR2012-0100 |
| HOSE SPECIFICATIO  TYPE: | | 3" C&K with corrugation |
| HOSE I.D. | | 3" |
| WIRE O.D. | | 5.66" |
| LENGTH: | | |
| WORKING PRESSURE: | 10,000 | PSI |
| TEST PRESSURE: | 15,000 | PSI |
| MIN. BURST PRESSURE: | 22,500 | PSI |

DESIGN:

| | | | | |
|---|---|---|---|---|
| STEM PN | RDS006 | FERRULE NO. | | RDF006 |
| STEM DIM. | | FERRULE DIM. | | |
| SWAGE | | INTERNAL EXP. | | 2.375 |
| DIE SIZE 1: 6.25  2: | | SWAGE OD: | 1: | 2: |

| | | | |
|---|---|---|---|
| COMPRESSION % | DESIGN: 21.00% | ACTUAL: | |
| TIME HELD @ TEST PRESSURE | | BURST | |
| ACTUAL BURST PRESSURE | | 24,200 | PSI |

O-rings inserted first 12" of corrugation (after internal skive).

COMMENTS:

Figure 21 (TABLE 1)

LABYRINTH SEAL SWAGE COUPLING FOR HIGH TEMPERATURE/PRESSURE REINFORCED RUBBER HOSE AND METHODS OF ATTACHMENT

This application claims priority from both U.S. Provisional Application Ser. No. 61/796,810, filed on Nov. 20, 2012, and U.S. Provisional Application Ser. No. 61/685,339, filed on Mar. 15, 2012, in the United States Patent and Trademark Office, and further is a Continuation-in-Part of Applications 61/685,339 and 61/796,810.

TECHNICAL FIELD OF THE INVENTION

The present invention relates generally to the reinforced hose industry and in particular to a system for attaching high temperature and pressure large diameter flexible reinforced rubber hose utilizing an inner tube manufactured from metal, plastic, nylon, rubber or similar material and being corrugated or smooth to a specialized swaged hose coupling resulting in a high pressure high temperature hose assembly for use in the energy, marine, petrochemical and like industries.

BACKGROUND OF THE INVENTION

High-pressure reinforced hose is used in many instances in industry but particularly in the mining, construction, energy, marine and petrochemical industries. Flexible hose is used to transfer fluids under various pressures and temperature between two points, one or both of which, may move relative to each other or to another fixed point in space. Piping at the two points is generally metal (or some other form of fixed conduit), and the flexible hose must attach to the piping at both ends. This requires a coupling on each end of the hose.

In the drilling industry, a flexible hose runs between the pump piping system on the rig and the kelly that is coupled to the rotating drill string. The pump system forces drilling fluid down the center of the drill pipe, and back through the wellbore, in order to flush cuttings from the wellbore (plus providing wellbore stability, etc.). In this instance, the flexible hose is subjected to high pressures. The high pressure is required to both transfer drilling fluid into the wellbore and overcome static return head pressures—the deeper the wellbore, the higher the pressure.

The rotary drilling hose is subject to further stress in that it hangs down within the derrick supported at either end by the metal coupling on the hose and the fact that the kelly is moved up and down literally thousands of times during the drilling operation. This means that the hose is subject to stress at the metal coupling (in addition to being subject to stress throughout its length). Thus, a highly reliable bonding between the hose and the coupling is required for protection of personnel and equipment. If the hose breaks loose from the coupling, it could easily fall and cause severe damage on the drill floor of the rig. In a similar manner, if the hose breaks, circulation may be lost resulting in a well blowout situation.

The specifications for kelly hose or, to use the proper term, "rotary drilling hose," may be found in American Petroleum Institute ("APP") Specification 7K. This specification provides general principles and specifies requirements for design, manufacture, testing of new drilling and well-servicing equipment, and of replacement primary load-carrying components manufactured subsequent to the publication of the specification. Specification 7K is applicable to rotary drilling hose plus other equipment used in drilling. It should be understood that the drilling hose assembly is defined as the hose body (the actual flexible reinforced hose) plus the hose coupling (the metal termination at both ends which is attached to the hose—the transition for the hose to the steel). Thus, the API specification includes the hose coupling. The hose coupling in turn will mate to raised-faced flanges, dresser-couplings, or whatever is required to mate the hose assembly to the mud system-piping.

The drilling industry also utilizes flexible hose in a well operation called choke and kill. This particular operation is employed when a well is experiencing pressure difficulties usually caused by formation pressures, a gas kick, or the like. During normal onshore well control operations kill fluid is pumped through the drillstring and annular fluid is taken out of the well through the choke line to the choke, which drops the fluid pressure to atmospheric pressure. If the drillpipe is inaccessible, it may be necessary to pump heavy drilling fluid in the top of the well, wait for the fluid to fall under the force of gravity, and then remove fluid from the annulus. In such an operation, while one high pressure line would suffice, it is better to have two as two hoses provide a measure of redundancy for the operation. In floating offshore operations, the choke and kill lines exit the subsea Blow Out Preventer ("BOP") stack and run along the outside of the riser to the surface. Connection between pump piping and between choke piping is often accomplished using flexible reinforced hoses called "choke and kill" hoses.

The specifications for choke and kill hoses may be found in API Specification 16C (2004, $2^{nd}$ Edition which is currently under revision by the API). Specification 16C was formulated to provide for safe and functionally interchangeable surface and subsea choke and kill systems equipment utilized for drilling oil and gas wells. The API requires that choke and kill system components shall be in accordance with the applicable sections of the specification, and the technical content of the specification provides the minimum requirements for performance, design, materials, welding, testing, inspection, and storing and shipping. Remember that the choke and kill hose assembly is defined as the hose body (the actual flexible reinforced hose) plus the hose coupling (the metal termination at both ends which is attached to the hose—the transition from the hose to the steel). Thus, the API specification includes the hose coupling. The hose coupling in turn will mate to raised-faced flanges, dresser-couplings, or whatever is required to mate the hose assembly to the well control system piping.

In order to obtain a high-pressure flexible rubber hose (the term rubber is used as a generic term and does not specifically mean natural occurring rubber gum), a hose manufacturer incorporates a reinforcing material. Thus, the hose will consist of an inside sealing membrane (the fluid tight element, liner, or inner tube), an inner rubber element formed about the inner tube, a reinforcing element, an outer rubber element, and finally some sort of abrasive resistant covering. The reinforcing element can be polyester or similar organic material; carbon fiber or similar high technology material; or metal (steel) generally in the form of wire or cable. The reinforcement generally is used in multiple layers called "plies" and is usually made of steel.

There is a plurality of types of reinforcing employed by the hose manufacturer that is set down in even layers—i.e., 2 layers, 4 layers, 6 layers, etc., single wire or cable wire, and grading systems are used to specify burst pressures for hose. For example, for Rotary Drilling Hose (rotary hose), grade C hose, rated at 4000 psi, has a test pressure of 8000 psi, and a minimum burst pressure of 10,000 psi. Grade D hose, rated at 5000 psi, has a test pressure of 10,000 psi, and minimum burst pressure of 12,500 psi. Grade E hose, rated at 7,500 psi, has a test pressure of 15,000 psi, and minimum (guaranteed) burst pressure of 18,750 psi. Grade C and D hose are 2 ply hose, although there is some 4 ply D hose. Most grade E hose is 4 ply.

The grade and burst pressure specifications are different for Choke and Kill Hose when compared to rotary drilling hose. Essentially there are two grades of Choke and Kill ("C&K") Hose: Super and Regular. Regular grade C&K hose, is rated at 10,000 psi, has a test pressure of 15,000 psi, and minimum burst pressure of 22,500 psi. Super C&K hose, is rated at 15,000 psi, has a test pressure of 22,500 psi, and minimum (guaranteed) burst pressure of 33,750 psi. In addition, C&K hose must be able to handle two-phase fluids (liquid with gas). Thus, a standard rubber liner will not meet the API 16C specification. The industry therefore employs a plastic liner or a metal liner.

Generally a hose manufacturer manufactures flexible hoses to specific order by the purchaser who specifies length, diameter, pressure, service ratings and required end connections. These flexible hoses are generally referred to as a "hose assembly with end connectors" or "a built-up hose assembly." This term is used throughout the industry.

In a built up hose assembly with end connections, the manufacturer during the course of manufacturing terminates the rubber hose into a metal fitting (the end connector) as specified by the purchaser. Thus, the manufacturer would make the inner rubber membrane ($1^{st}$ Carcass) and its associated inner fluid tight element (liner or inner tube) and terminate this assembly in the end connector. The manufacturer would then add the wire reinforcement, as needed, terminating each reinforcing wire (or cable) in the end connector. Two techniques are typically employed by hose manufacturers for terminating the wire reinforcing in or on the end connector itself but are beyond the scope of this discussion. Finally the outer rubber element or layer ($2^{nd}$ Carcass) and outer abrasive resistant cover (cover) would be formed about the reinforcing wire or cable and the overall product vulcanized to achieve a cohesive product.

It takes time to manufacture a hose assembly with end connections and often such a hose is needed almost immediately by industry. In order to service this demand a separate industry termed the local market distributor has evolved. The local market distributor keeps bulk reinforced hose—hose without connectors—in inventory. The purchaser would specify the hose requirements—diameter, length, pressure rating and end connectors—to the local market distributor. The local market distributor then takes bulk reinforced rubber hose from inventory, cuts the hose to required length, and places a coupling on each end of the hose. Bulk hose is available in varying lengths from a hose manufacturer, and the actual bulk length (between 90 and 110 feet) will depend on the mandrel used by the particular hose manufacturer.

The resulting hose is called a SWAGED or CRIMPED HOSE, depending on the method used to "place" the end connector onto the hose, where the term "place" is being used to include both swaging and/or crimping operations. It should be noted that swaging and crimping accomplish similar end results.

The current state of the art in swaged (or crimped) connectors has evolved to using an outer ferrule with lands (internal ridges) that are compressed around the end of a reinforced hose over a stem that is inserted into the end of the hose. The stem may or may not have barbs that are meant to improve the "grip" between the hose and the end connector. Often, the outer layer of hose rubber is "skived" which means that the outer layer of rubber is removed exposing the reinforcement (although some local distributors do not skive).

The reinforced hose is actually held in the end connector by the ridges of the ferrule gripping the reinforcement via compression of the hose by the ferrule against the stem. The compression operation (swaging or crimping) of the ferrule against the reinforcement and against the inner stem creates severe stress and strain within the rubber of the hose and in particular the reinforcement which often leads to premature failure of the assembly.

Development of high pressure swaged end connectors for rubber hose has extended over a period of years and the art runs the gauntlet from low temperature and/or low pressure to high temperature and/or high pressure applications. The hose diameters range from fractional inches (fractional centimeters) to tens of inches (fractional meters) and the manufacturers/providers of connectors realize that the pump-off force on the fitting is proportional to the inside diameter of the hose and the applied pressure.

The reader should remember that there is a huge difference between small diameter high pressure hydraulic hose and large diameter high pressure/temperature hose found in the energy, marine, petrochemical and like industries. This difference is found both in the hose and the design of end connectors and techniques for fitting the end connectors to the large diameter hose. Because the large diameter hose involves substantially more material (liner, inner membrane, reinforcement, outer membrane and cover) than a small diameter much more force must be applied to the end connector and substantially more hose material will move during the attachment of the end connector to the large diameter hose. Thus, the increased movement and mass of the hose material must be accounted for in the design of the end connector and overall hose assembly.

As explained in U.S. Pat. No. 7,388,090 to Baldwin et al., which is incorporated in its entirety in this disclosure by reference, most of the standard prior art uses a serrated stem that has backward facing teeth that grips the inner liner of the hose to retain the stem in the hose. Further the art also uses a series of lands (ridges) within the ferrule that bite into the outer layer of the hose and the reinforcement and supposedly causes the teeth (or barbs) of the stem to bite further into the inner lining. It should be noted that the early work by Baldwin et al. has been directed towards rotary hose covered by API specification 7K.

In their disclosures Baldwin et al. explain that the standard art causes severe failure of the reinforcing cable (or wire) because the sharp edges of the connector damage the reinforcement.

In order to overcome this basic failure Baldwin et al. proposed an invention that consisted of a "waved" ferrule and stem that joins an end connector to flexible reinforced rubber hose thereby forming a "double sine-wave lock" between the ferrule and the stem, and thereby making certain that the axial tension is transferred to the ferrule from the reinforcement (see U.S. Pat. No. 7,388,090).

The ferrule and stem are welded together at the coupling end leaving an opening, which accepts the reinforced rubber (elastomer) hose in almost the same manner as a normal "ridged" ferrule and "barbed" stem fitting. Rather than having straight sides the lands of the ferrule and high points of the stem have a sinusoidal shape—wave. The wave pattern has the appearance of ripples on a pond caused by throwing a stone into the water.

The 'double sine-wave lock' invention locks all the plies of hose reinforcement inside the end connector, between the stem and ferrule, in a sine wave compressed against the ferrule to give the fitting an overall strength that is in excess of the strength of the free standing hose (without end connectors) whether or not the hose is under pressure, that is the connector and hose within the connector will not be the weak link. Grade E hose has a minimum burst pressure of 18,750 psi; thus the instant device, when used with grade E hose will have an overall strength greater than 18,750 psi. (At these pressures the pump-off forces involved reach or exceed 400,000 pounds$_{force}$ depending on the cross sectional areas.) The invention carefully considers the material forming the ferrule and stem and the relative movement of those materials while attaching the end connector to the hose along with the unpredictable qualities of rubber and flexible hose construction to minimize induced stress in the hose reinforcement. All of these factors, including the sinusoidal shape of the ferrule and stem and the preferred two-step method of attachment (internal expansion of the stem followed by external swaging of the ferrule), operate together to form the original Baldwin et al. sine-wave lock invention. Thus, Baldwin et al. in their device have reduced the movement of hose material during the fitting operation(s) when compared to the prior art. This principal is the underlying concept behind the works of Baldwin et al.

Baldwin et al. have proposed an improvement to the original Baldwin et al. device wherein the improvement is a ferrule wherein all the flutes follow a modified (sine x)/x function in that the flutes go from a maximum height at the termination end of the connector to a minimum height at the hose end of the connector. The lands between the flutes are sloped or curved following a modified (sine x)/x function. The associated stem has a series of matching bumps that, when the swaging operation is complete, align within the center of the lands of the ferrule. Although the bumps have heights that vary from a maximum at the termination end of the connector to a minimum at the hose end of the connector, there is no true modified (sine x)/x that defines the bumps (unlike the original Baldwin et al. invention). The stem and ferrule are connected together by a suitable process, such as welding.

The end connector of the second Baldwin et al. device is joined to the reinforced hose in the standard manner without first internally expanding the stem (a further attempt to reduce material movement during the fitting operation) and may involve skiving the outer jacket. The hose is carefully placed within the end connector cavity formed between the ferrule and the stem to the point where the end of the inner tube rests just past the last flute and within the last land at the termination end of the connector. The fitting is then preferentially swaged onto the hose using standard techniques.

As the swaging process occurs, the small bumps on the stem create and offset force which causes the reinforcing to expand into the lands of the ferrule forming the sine-wave lock between the reinforcement and the lands and flutes of the ferrule.

Baldwin et al. have proposed a further improvement to the swaged hose coupling wherein the coupling adds an internal set of grippers designed to bite into the reinforcement of the hose, a "rubber dam," and their standard and proved sinusoidal wave grip. This improvement was necessitated by the high temperature and vibration requirements of the API specification 7K for rotary hose.

The stem may be coated, during manufacture or at any time, with a friction reducing material that allows the inner tube of the reinforced hose to more freely slide along the stem during the process that swages (or crimps) the connector to the hose. An expansion area for excess rubber and other 'by-products' of the swaging operation is provided at the termination end of the connector (i.e., between the ferrule and stem at the termination end of the connector). However; in the design of the end connector every attempt is made to reduce material movement.

The Baldwin et al. devices have as one object the reduction of induced stress within the high pressure hose during the swaging operation, and are in fact very concerned with stress in the inner tube used in API 7K rotary hose. If the inner tube is over stressed during the swaging operation there is a high probability that the inner tube will rip and fail under pressure, and the hose will leak about the end connector thus rendering the entire flexible hose system unusable. This failure has been attributed to excessive material movement during the fitting operation(s).

In the meantime, Baldwin et al. have turned their attention to a swaged coupling for use in Choke and Kill hose. Because Choke and Kill ("C&K") hose must handle entrained gases in the liquid a new set of problems arise. It should also be noted that the current art only employs built-up hose (remember that built up hose implies the hose connector is attached to the hose while the hose is being manufactured).

Most manufactures of C&K hose use a plastic inner tube because a rubber inner tube will NOT retain entrained gases in the liquid passing through the hose: particularly at the extreme pressures involved. As the fluid temperature rises, the retention of entrained gases becomes more difficult with the resulting in problems with the inner tube. If the inner tube is rubber, the inner tube will simply fail and the hose will leak and then suffer an overall failure.

In the case of plastic liners the problem is a little more subtle. Entrained gases migrate into the liner, during a choke and kill operation. When the choke and kill operation is complete, the hose manufacture requires a stepped release of hose pressure over time. Very much like a deep sea diver who must slowly decompress in steps after a deep dive. If the hose is not slowly brought back to atmospheric pressure, the liner will collapse on itself as shown in FIG. 1. (In fact Baldwin et al. have successfully swaged some of their fittings to plastic lined reinforced rubber hose, but if the pressure step down procedures are not followed the liner will collapse on itself.) It is known that, even if the manufacturer's pressure step procedures are followed, the liner often collapses on itself rendering the hose unusable!

In mid-2012 and in order to avoid the problem with collapsing liners (inner tubes), some hose manufacturers began to experiment with heavier plastic liners, nylon-based liners, and other forms of dense plastic liners. These manufacturers believe that a thicker inner tube or a denser type of plastic (nylon or the like) will reduce the migration of gases through the inner tube. These newer hoses are manufactured as built up hose assemblies; however, some of this hose is available to the custom hose assembly manufacturer.

Baldwin et al. have tested some plastic inner tube hose that meets the lower pressure limits of API 16C, using plastic lining, with their fittings designed for 3'-inches or less. However, these hose assemblies will only meet the regular choke and kill test/burst pressures. (WP=10,000, Test=15,000, and Burst=22,500 psi). It is known that some leakage still occurs between the stem of the Baldwin et al. swage end coupling and the liner and into the hose itself.

This being the case, a specialized swage fitting is needed that will seal against the inner tube and retain the hose within the fitting.

The problem with plastic liners may be overcome by using metal lined reinforced rubber hose, and some manufacturers now offer a metal lined reinforced rubber hose which meet some of the specifications of API specification 16C for Choke and Kill hose. These hoses are usually made with corrugated stainless steel which is impervious to gas. These hoses are manufactured as built up hoses (see above) and currently the art does not have any technique or device that may be used with custom built hoses (see above). It should also be noted that no manufacture can yet fully meet the API standard for Super C&K hose. Generally the hose fails to reach the burst pressure limit of 33,757 psi because the hose begins to leak around the hose coupling (the actual metal coupling that attaches to the hose—built-up or swaged). Some manufacturers can meet the standard using plastic-lined hose, but the plastic generally collapses on itself when the pressure in the hose is reduced to atmospheric even when the manufacturer's pressure reduction recommendations are followed.

The corrugated metal lined hose will meet the specifications of API 16C (and API 7K) with the added advantage that the metal liner is impervious to entrained gases and therefore will not collapse on itself when the pressure in the hose is reduced. A series of specialized couplings were manufactured following the disclosure of the parent provisional application 61/685,339. However, in swaging the couplings to the corrugated metal lined hose it was discovered that the corrugations collapsed and deformed. In fact the deformation was much greater than expected and resulted in the loss of the anticipated labyrinth seal and the subsequent failure of the fittings during pressure testing. Therefore, the inventor team returned to the drawing board to find a solution to the problem. Thus, there still is needed a specialized coupling and associated method of attachment employing swaged end couplings corrugated metal (or otherwise) lined reinforced rubber hose that will meet or exceed the specifications found in API 16C, or for that matter API 7K. This disclosure addresses that need.

As stated earlier, some hose manufacturers claim that their newly available dense plastic, nylon plastic, or thicker plastic smooth inner tubes will also meet the API specifications. In fact, some manufacturers are experimenting with smooth thin wall stainless steel lined reinforced rubber hose. Even considering that these claims must be proved, the inventor team returned to the drawing board to find a solution to the problem. Therefore, there is still needed a specialized coupling and associated method of attachment employing swaged end couplings to smooth plastic, nylon or the like, lined reinforced rubber hose that will meet or exceed the specifications found in API 16C, or for that matter API 7K. It is believed that this disclosure addresses that need.

SUMMARY OF THE INVENTION

The instant invention modifies the standard method for attaching a standard reinforced rubber hose to the specialized fitting manufactured by the George Myer Company of Houston, Tex. These fittings, of which there are four basic fittings, all employ the sinusoidal lock feature of U.S. Pat. No. 7,338,090 with corresponding Canadian and Chinese Patents, and patents pending in various countries (plus other patents pending on additional coupling features) to obtain a labyrinth seal between the sinusoidal wave like appearance of the stem and the inner tube of the hose.

The concept of a labyrinth seal is well known in mechanical engineering. Wikipedia defines such a seal as:

> ... a type of mechanical seal that provides a tortuous path to help prevent leakage. An example of such a seal is sometimes found within an axle's bearing to help prevent the leakage of the oil lubricating the bearing.
>
> A labyrinth seal may be composed of many grooves that press tightly inside another axle, or inside a hole, so that the fluid has to pass through a long and difficult path to escape. Sometimes screw threads exist on the outer and inner portion. These interlock, to produce the long characteristic path which slows leakage. For labyrinth seals on a rotating shaft, a very small clearance must exist between the tips of the labyrinth threads and the running surface.
>
> Labyrinth seals on rotating shafts provide non-contact sealing action by controlling the passage of fluid through a variety of chambers by centrifugal motion, as well as by the formation of controlled fluid vortices. At higher speeds, centrifugal motion forces the liquid towards the outside and therefore away from any passages. Similarly, if the labyrinth chambers are correctly designed, any liquid that has escaped the main chamber becomes entrapped in a labyrinth chamber, where it is forced into a vortex-like motion. This acts to prevent its escape, and also acts to repel any other fluid. Because these labyrinth seals are non-contact, they do not wear out.
>
> Many gas turbine engines, having high rotational speeds, use labyrinth seals due to their lack of friction and long life.
>
> Labyrinth seals are also found on pistons, which use them to store oil and seal against high pressure during compression and power strokes, as well as on other non-rotating shafts. In these applications, it is the long and difficult path and the formation of controlled fluid vortices plus some limited contact-sealing action that creates the seal It should be noted that the labyrinth seal is generally employed in rotating equipment; however, such seals can be used in reciprocating equipment, as noted in the explanation by Wikipedia. The seal is formed by a long tortuous path along with vortices within the fluid that is trying to pass through the labyrinth seal. In the case of the present invention the seal is a metal to metal contact with a long tortuous path for corrugated inner tubes or a series of O-ring seals for smooth inner tubes. The inventors have recognized that the principal of the labyrinth seal can be used in a stationary environment with great success, which will allow for minor movement of the liner itself while retaining an effective seal.

Thus, the labyrinth seal obtained by the instant method of swaging is a stationary seal formed between the tips of the corrugation and the stem of the hose coupling or between the smooth (or relatively smooth) inner tube and a series of O-ring seals held in the stem of the hose coupling.

In the case of a corrugated liner, it is imperative that the tips of the corrugations not be compressed in such a manner as to crush the corrugation, but that the corrugations deforms in a controlled manner. The technique involves careful choice of end fitting and swage operations to make certain that the corrugation has minimal (if no) deformation because the labyrinth seal is obtained between the tips of the corrugation and the metal stem. In fact, during the production and testing of a series of prototype fittings and associated hoses, it was found that the corrugated lining collapsed far more than anticipated simply because the hose rubber was far too soft to lend support to the corrugations. Thus techniques (and fittings) were required to eliminate collapse of the corrugations against the stem of the fitting. This is covered in further detail in paragraph 0042 et seq.

In the case of the smooth liner, it is imperative that several steps be taken to ensure that the O-rings used in the labyrinth are effective. First the proper choice of O-ring material must be made and second the fitting must be designed so that coupled with the swaging operation(s) the inner tube presses against the stem, slightly deforms about the O-rings while the O-rings keep their shape, and yet forms the necessary sine-wave like lock in the reinforcement.

Four basic types of hose couplings may be employed within the bounds of the method, these being:
An end coupling having grippers on the ferrule ferule and stem, along with a rubber dam, which make direct contact with the reinforcement of the hose—this requires both internal and external skiving of the hose and wherein:
internal expansion of the stem is employed (FIG. 8), or
without internal expansion of the stem (FIG. 9).
An end coupling without grippers—this can require external skiving of the hose and is much easier to attach and wherein:
internal expansion of the stem of the stem is employed (FIG. 10), or
without internal expansion of the stem (FIG. 11).

In addition, as discovered during testing of the first iteration of the instant invention, the stem of the fitting must be manufactured in such a manner as to provide as reasonable surface for the corrugations of the corrugated inner tube to rest against and thereby provide the required labyrinth seal. The same reasoning applies in the case of the smooth or relatively smooth inner tube. This leads to helping to form the long tortuous path required in a labyrinth seal. This allows for slight movement of the liner along the stem.

The second iteration of the instant invention comprises a smooth transition on the stem of the ferrule for receiving the corrugations of the liner (in the area where the hose is internally skived) and the insertion of elastomeric-like ring between the exposed corrugations in the liner in the region where contact will be made between the liner and the stem during swaging. The insertion of the rubber rings adds support to the corrugations so that the corrugations deform in a controlled manner thereby ensuring a labyrinth seal between the stem and the corrugations. If this support is not present, the corrugations fold over and crush resulting in a leak path with the consequential loss of seal as shown in FIG. 12. The remainder of the fitting retains the gripper and transition sections of the original first iteration prototype fitting.

The third iteration that is used with a hose utilizing plastic, nylon or similar materials for the inner tube is similar to the second iteration except that a series of O-ring grooves are formed in the stem of the hose coupling in which lubricated O-rings are installed. The choice of O-ring material must be made carefully to meet the temperature requirements of API 16C (generic nitrile or the specialty DuPont® product Kalrez® are suitable) while not over compressing to destroy the seal. The series of O-rings thereby form the labyrinth seal in that a small pressure drop will occur across each O-ring. Internal skiving of the hose is not necessary (unless the manufacturer adds a further rubber inner liner to the inner tube) except where the preferred embodiment having internal grippers is employed.

In reading this disclosure and claims of the instant device and method, it should be understood that the drawings used are for purposes of illustration. Actual position of elastomer inserts and number can vary in the case of a corrugated liner. In the case of a smooth liner the positioning of the O-rings grooves in the stem can vary as well as the number. Finally the term "sine-wave lock" as used in the claims refers to method and device characteristics of holding the hose in the fitting and forming the sine-wave in the reinforcement. This lock means is found between the ferrule and stem as described in the art mentioned. The gripper means are the direct lock to the reinforcement which occurs between the stem and the ferrule.

BRIEF DESCRIPTION OF THE DRAWINGS

FIG. 21 is the test table for the prototype hose assembly incorporating the second iteration of the instant invention which attained a burst pressure of 24,300 psi.

DESCRIPTION OF THE PREFERRED EMBODIMENT

Figure 1:
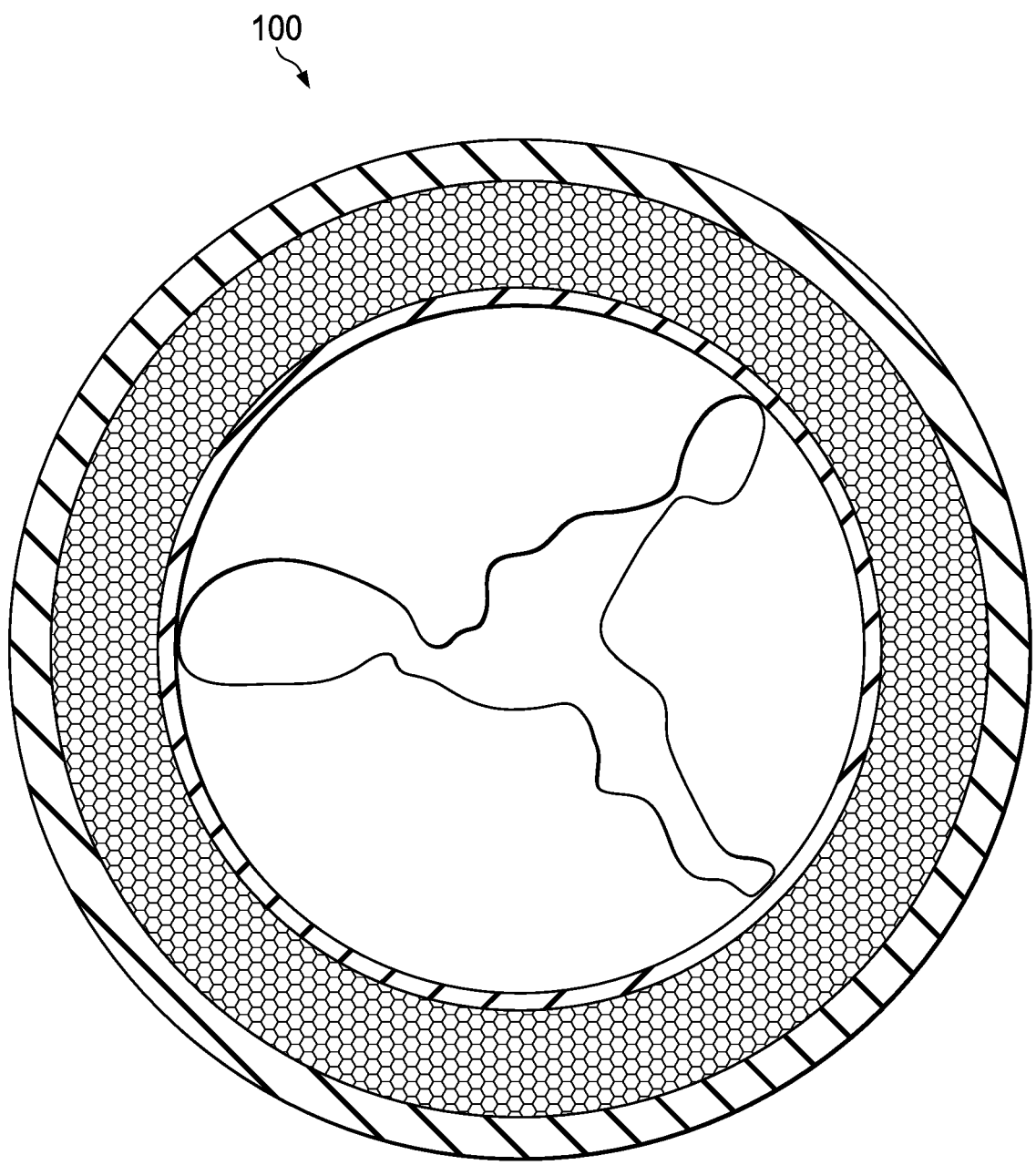
FIG. 1 shows a collapsed inner liner in a rubber hose caused by pressure fluctuations.
Figure 2:
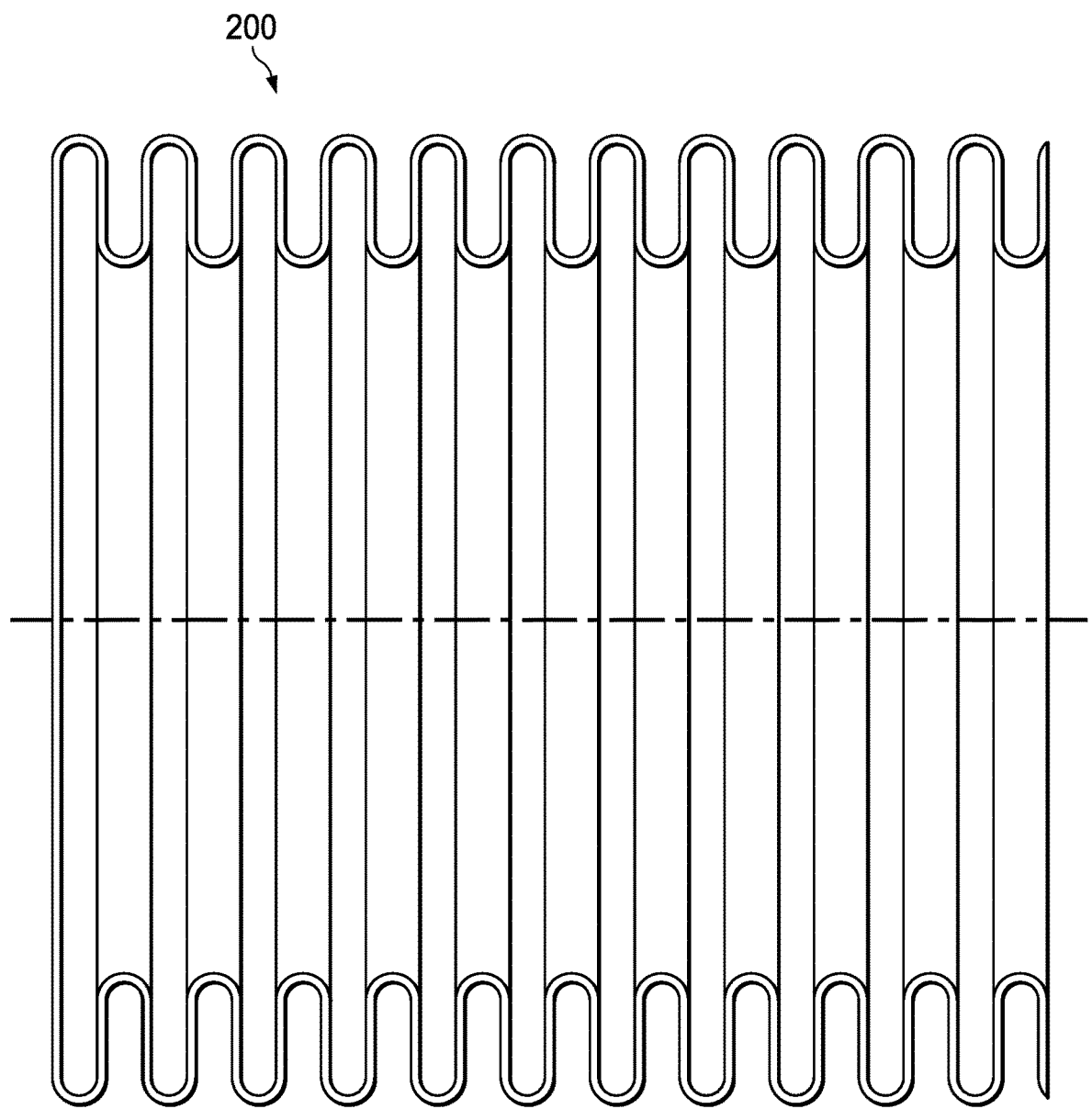
FIG. 2 shows a corrugated metal liner.
Figure 3:
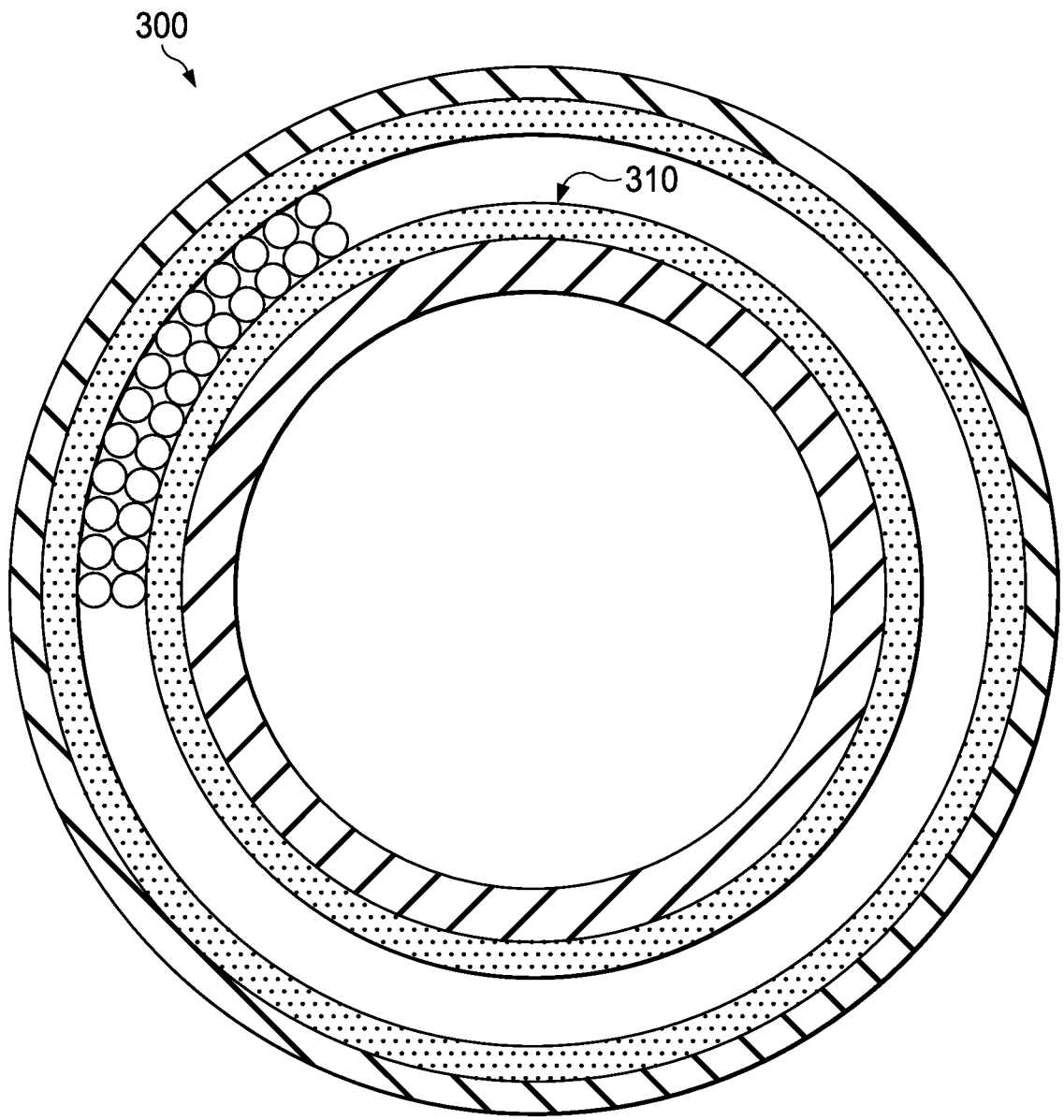
FIG. 3 is a general illustration of reinforced hose with a smooth liner; however, the construction of the hose is similar for a corrugated liner.

FIG. 1 shows a plastic liner 100 collapsed onto itself. Note how the internal diameter of the hose is sharply reduced. As stated earlier, it is known that this collapse will occur even when the manufacturer's procedure for reducing pressure in a hose are followed to the letter. FIG. 2 shows a corrugated liner 200 for use in a reinforced rubber hose. (Remember that the term "rubber" is not used to describe only natural rubber, but any man-made elastomer used in hose manufacture.) FIG. 3 shows the construction of a cable reinforced flexible hose 300 employing a standard liner or inner tube 310. This liner may be rubber, plastic, nylon or like material, or metal. A corrugated lined hose will look the same in cross-section.

Figure 4A:
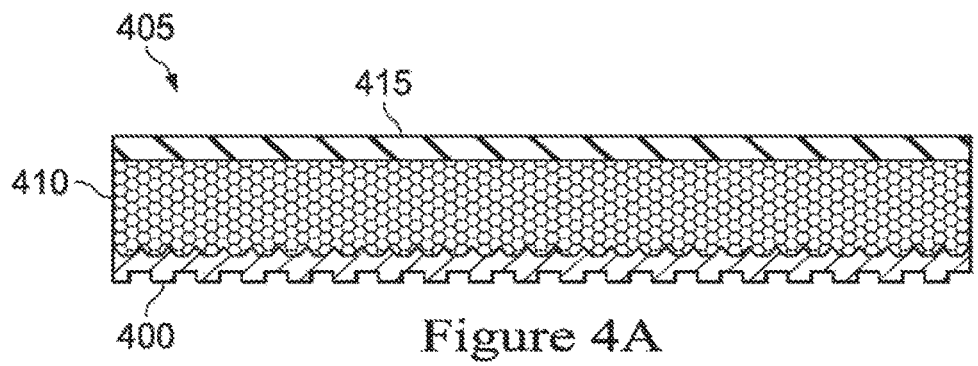
FIG. 4A is a clear illustration of a corrugated liner embedded within a reinforced rubber hose.
Figure 4B:
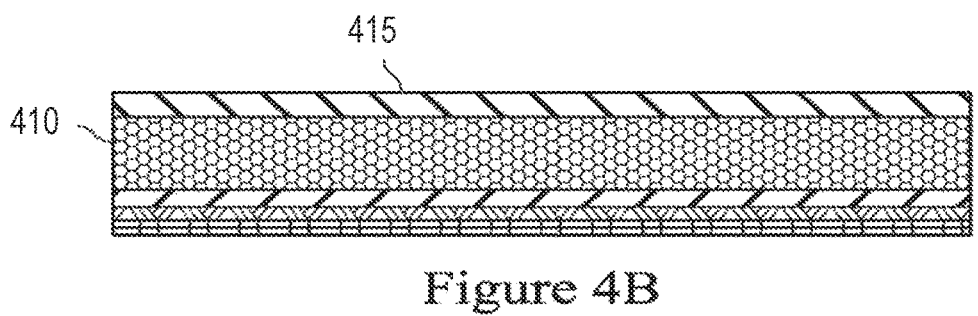
FIG. 4B is a clear illustration of a smooth liner embedded within a reinforced rubber hose.

FIG. 4A shows a corrugated liner 400 (metal or otherwise) embedded in a rubber hose 405, along with the reinforcement 410 and the outer cover 415. It should be noted that the inner rubber element (the rubber between the liner 400 and reinforcement 410) must fill the rubber side of the corrugations of the corrugated liner 400. Similarly FIG. 4B shows a smooth liner (plastic, nylon or like material, or metal) embedded in a rubber hose along with the reinforcement and the outer cover.

Figure 5A:
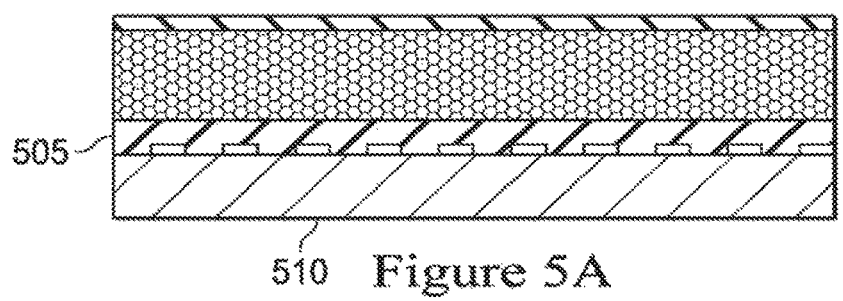
FIG. 5A shows the concept of a corrugated liner static labyrinth seal.
Figure 5B:
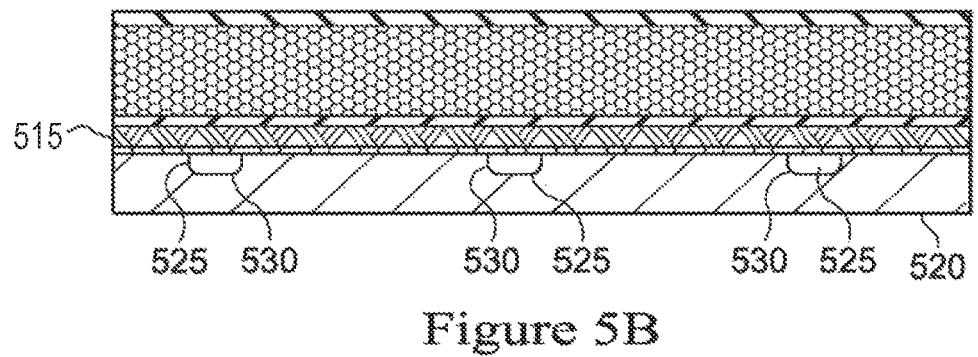
FIG. 5B shows the concept of a smooth liner O-ring static labyrinth seal.

FIG. 5A shows how the labyrinth seal between the corrugated liner 505 and the stem 510 is obtained. It should be noted that liner 505 must not be completely deformed so that the gaps between the tips of the corrugation (the corrugations on the non-rubber side) are overly compressed. Such action would destroy the labyrinth seal. (This effect was discovered during testing of the first iteration of the instant device and led to the second iteration.) FIG. 5B, on the other hand, shows how the labyrinth seal between the smooth liner 515 and the stem 520 is obtained. It should be noted that the O-ring material 525 and design should be chosen so that its deformation (when swaged) will seal between the groove 530 in the stem 520 and the liner 515

Figure 6A:
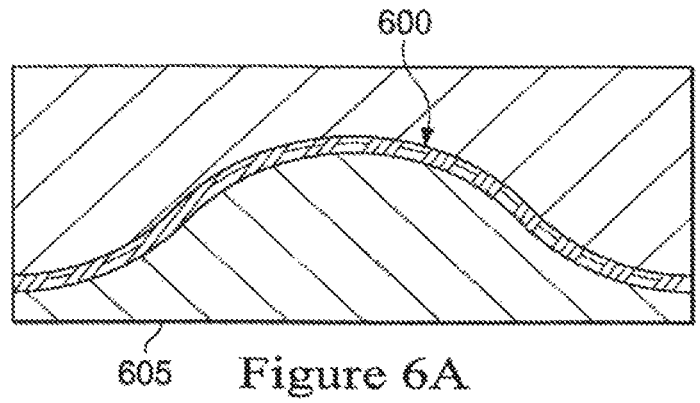
FIG. 6A shows a corrugated inner tube formed about one of the flutes in stem (sinusoidal lock) in the instant invention. Note the labyrinth seal between the corrugated liner tips and the stem.
Figure 6B:
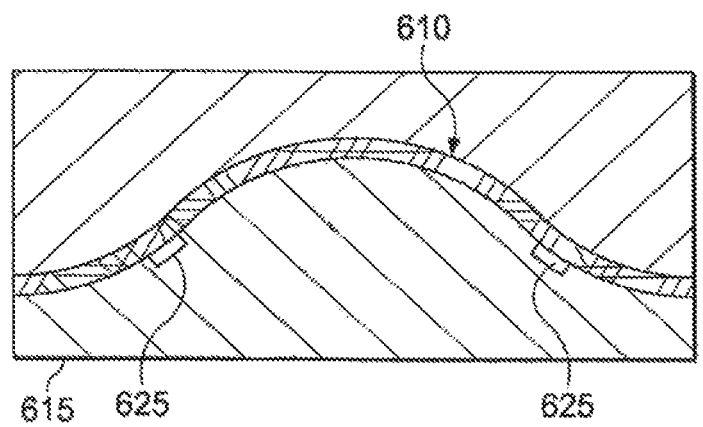
FIG. 6B shows a smooth inner tube formed about one of the flutes in stem (sinusoidal lock) in the instant invention. Note the labyrinth seal between the liner interacting with the O-rings in the stem.

FIG. 6A shows the undulating "wave" resulting when the hose coupling is swaged onto a corrugated lined reinforced rubber hose 600. Note how the tips of the corrugated liner follow the sinusoidal shape of the stem 605 of the fitting while forming a labyrinth seal between the tips and the stem 605. Further note the minimum deformation of the corrugations. Similarly, FIG. 6B shows the undulating "wave" resulting when the hose coupling is swaged onto a smooth lined reinforced rubber hose 610. Note how the liner follows the sinusoidal shape of the stem 615 of the fitting while forming a labyrinth seal between the smooth lined reinforced rubber hose 610 and the stem 615 utilizing the series of O-rings 625.

Figure 7:
FIG. 7 shows a free body diagram of the forces at work in a reinforced hose swaged onto a sinusoidal lock hose coupling under pressure utilizing a static labyrinth seal.

FIG. 7 illustrates the force transfer between the stem and the hose when the hose is under pressure. This force, if the fitting is properly swaged onto the hose will help keep the labyrinth seal effective between the hose and the coupling.

Although not clearly shown in the FIGS. 4A, 5A, and 6A, the tips and valleys, for lack of a better term, of the corrugations are rounded (as shown in FIG. 2). The "rounded shape" is maintained in the case of the smooth liner by judicious choice of O-ring material and stem/groove design. The two preferred embodiments of the instant invention will now be discussed in detail beginning with the embodiment for corrugated inner tubes (corrugated liners). The reader should note that there is little difference between the two embodiments; thus, the embodiment for corrugated liners will have more detail, and the embodiment for smooth liners will only discuss the minor differences.

The reader should also realize that there is little difference between the operations of swaging a hose to a fitting or crimping a hose to a fitting. The result of the two operations is the same: the hose is attached to the fitting. The mechanical technique of the operation is different; thus in this disclosure the description and claims can refer to swaging (the preferred technique) or to crimping (the alternate technique).

The Embodiments for Corrugated Inner Tubes

Figure 8:
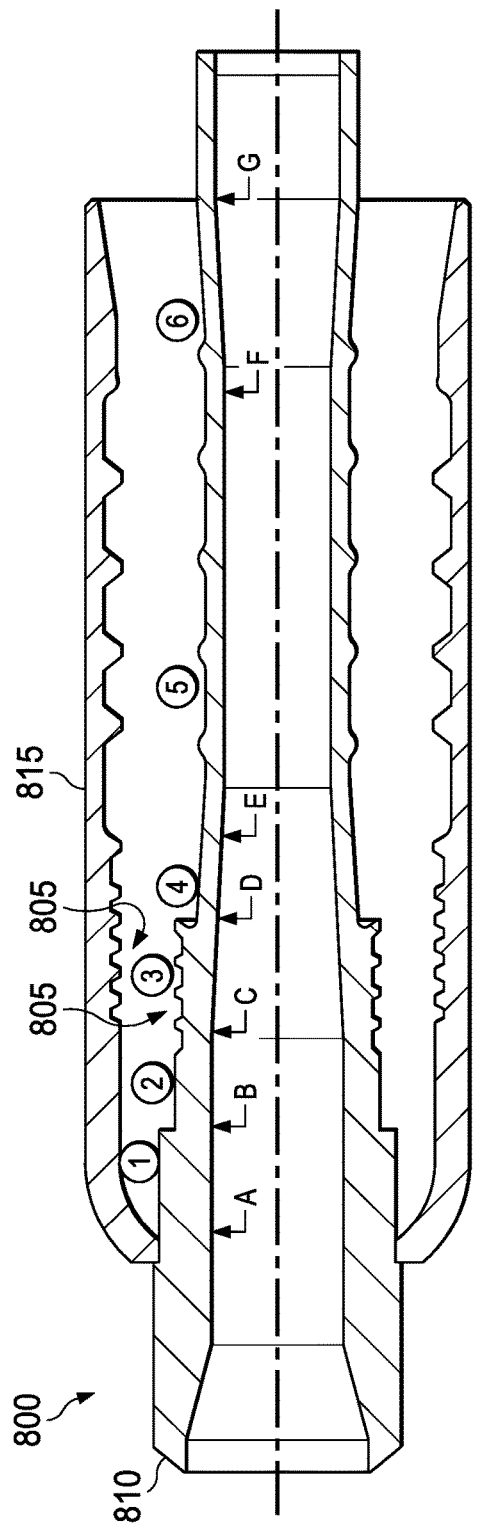
FIG. 8 shows a swage fitting with grippers and with internal expansion.
Figure 9:
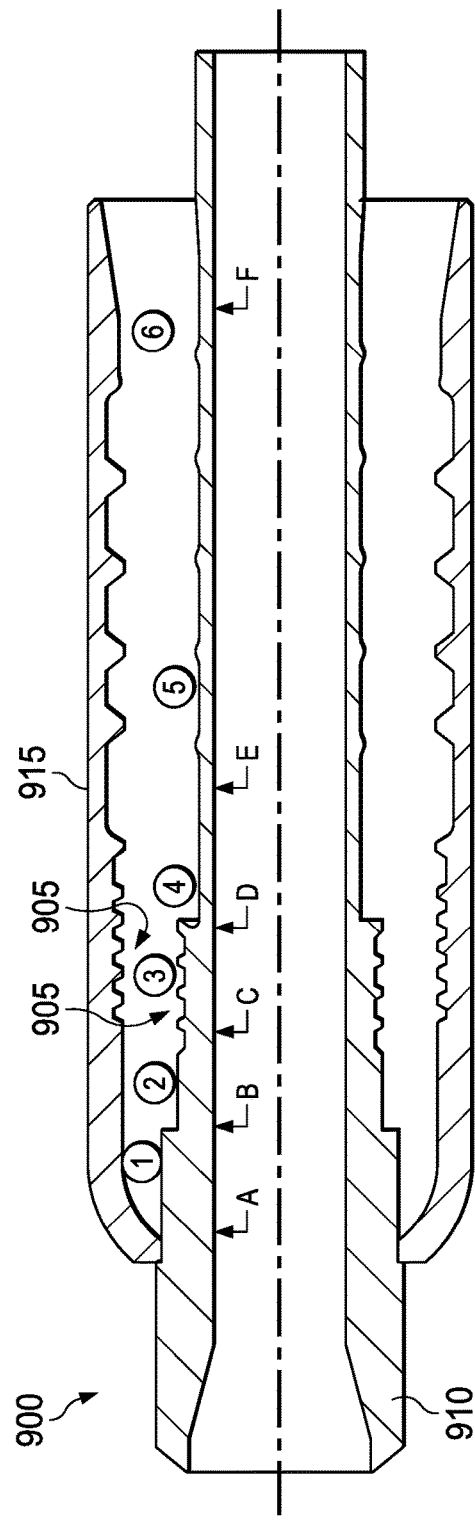
FIG. 9 shows a swage fitting with grippers and without internal expansion.

FIGS. 8 and 9 show two embodiments of the specialized end connectors 800, 900, which use internal grippers and the modified Baldwin et al. sine-wave lock, and are used in the methods of attachment herein disclosed. In particular, FIG. 8 shows the preferred embodiment of the specialized hose coupling with grippers 805 (in area 3) designed for use with internal expansion area 1 and then with external swaging. The stem 810 between points E and G is slightly less in internal diameter than the rest of the stem 810. Internal expansion forces the two internal diameters to be the same. This coupling is fully described in U.S. Application 61/514, 596 filed on Aug. 3, 2011: now published as WO 2013/019274. FIG. 9 shows an earlier embodiment 900 which is similar to the preferred specialized hose coupling of FIG. 8 also with grippers 905. This coupling 900 is more fully described in U.S. Patent Application Publication US 2011/0272943: being related to WO 2010/098833. All of these disclosures, including this disclosure, are related in time as continuations or continuations-in-part.

Figure 14:
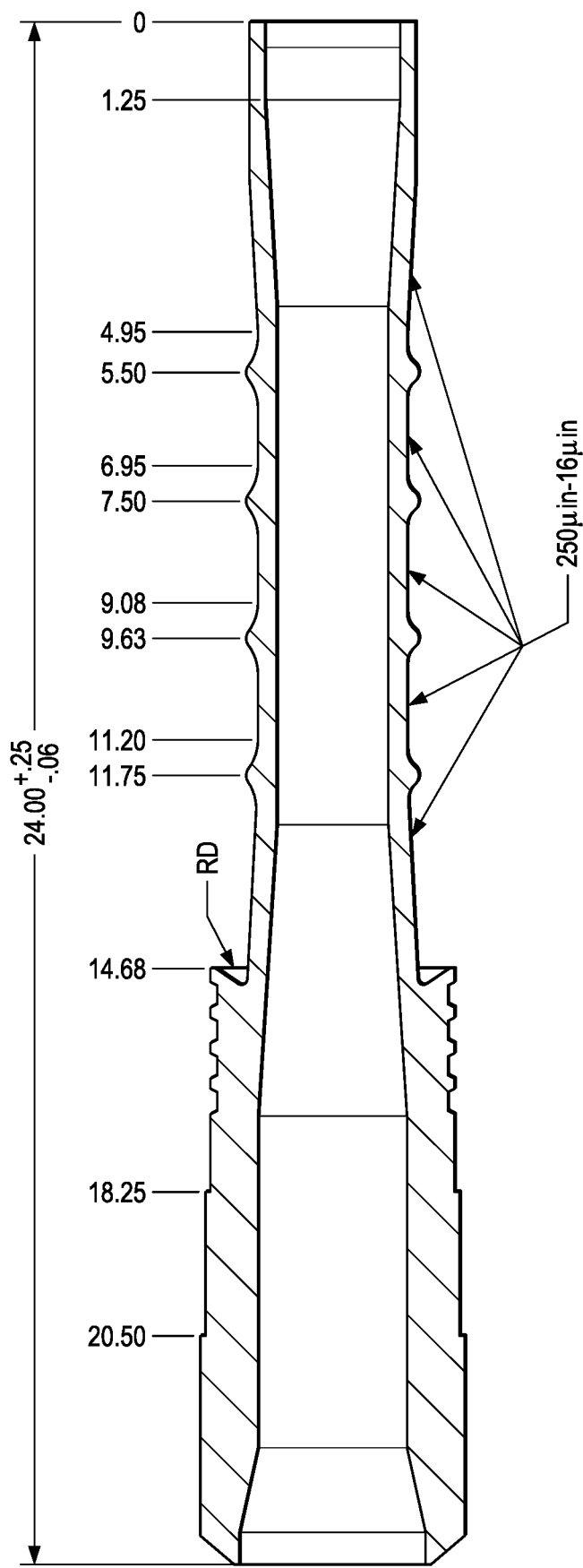
FIG. 14 shows the Stem of the prototype swage fitting of the second iteration of the instant invention.
Figure 15A:
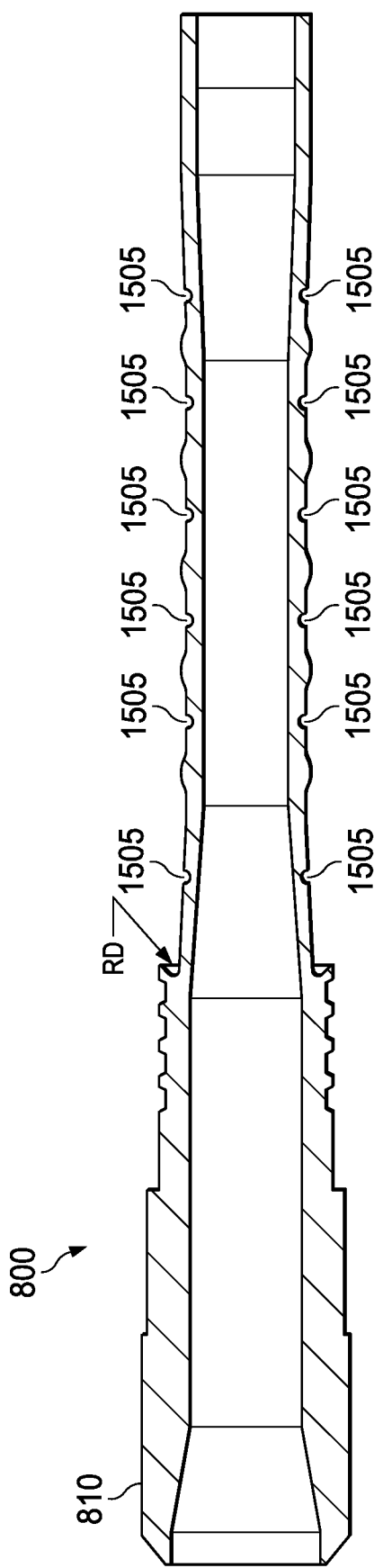
FIG. 15A shows the stem of the third iteration which provides the labyrinth seal for a hose using smooth plastic, nylon or similar material, or metal as the inner tube requiring internal expansion.
Figure 15B:
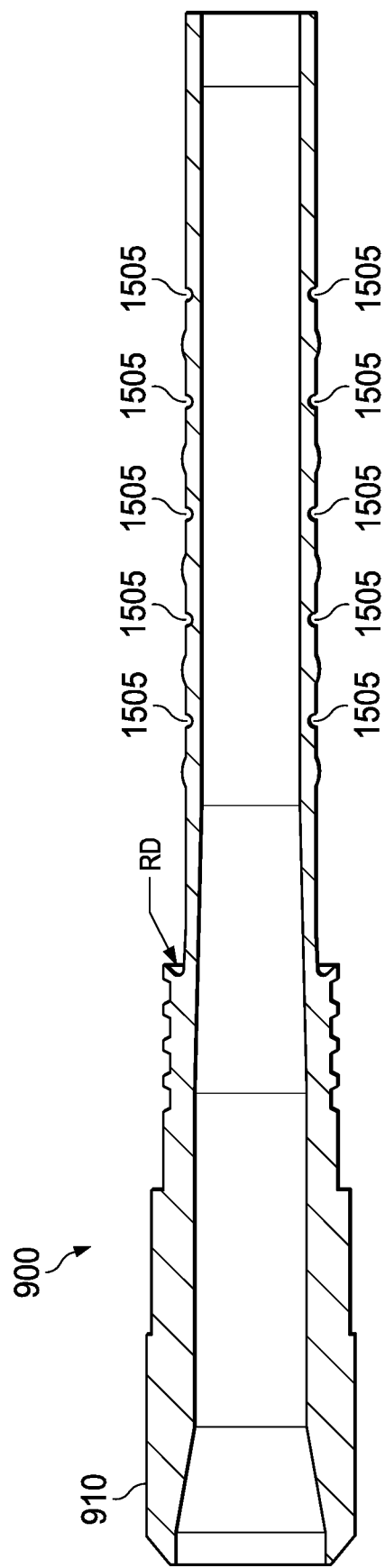
FIG. 15B shows the stem of the third alternate iteration which provides the labyrinth seal for a hose using smooth plastic, nylon or similar material, or metal as the inner tube without requiring internal expansion.

Both couplings require careful pre-swaging preparation of the corrugated lined hose. The inner corrugation lining must be "skived," which is a technically incorrect term because rubber is not removed: rather a portion of the inner lining (or inner tube) and any inner rubber is carefully removed to expose the inside of the reinforcement. The portion that must be removed is equal to the distance between B and D in the fittings shown in FIGS. 8 and 9. Then a portion of the external part of the hose is carefully skived to further expose the outside of the reinforcement between B and F shown in FIGS. 8 and 9. Note, when the hose is inserted into the fitting, "B" is the point to which the hose end terminates. The inner tube and inner rubber terminate against the "rubber dam," RD, as shown in FIGS. 14, 15A and 15B.

Figure 16:
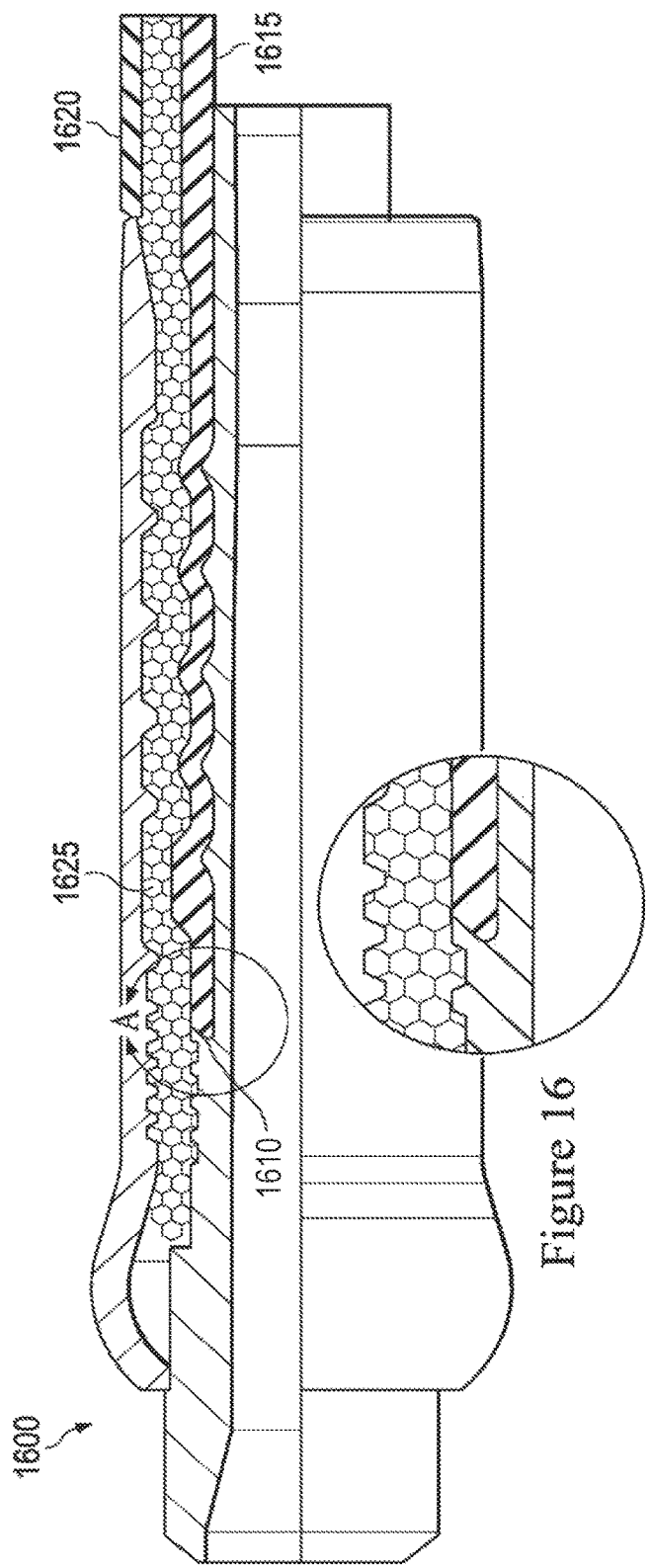
FIG. 16 shows the effect of the 'rubber dam' within the preferred fittings and how it inhibits the cold flow (oozing) of the inner rubber membrane.

As shown in FIG. 16, the "rubber dam" 1610 is designed to specifically inhibit and prevent the movement of the inner hose rubber 1615 of hose 1620 from oozing (cold flowing) into the open end of the end connector fitting 1600. If this rubber is allowed to move, it will cause two problems. One, the inner rubber 1615 will tend to block fluid flow through the neck of the fitting. Two, and far more critical, the movement of inner rubber 1615 from within the hose 1620 will weaken the hose 1620 around the inner tube 1615 between the inner tube 1615 and the reinforcement 1625. This will in turn weaken the inner tube 1615, which relies on the reinforcement 1625 to contain itself against the flowing fluid pressure. The net result is a potential failure of the hose assembly. Therefore, the rubber dam 1610 is critical to the performance of the hose assembly.

In the case of a corrugated hose used in the fittings of FIG. 8, and after the hose is properly prepared, the hose is positioned within the fitting and the stem internally expanded using an expansion plug as the first step in attaching the hose coupling to the hose.

For the second step involving the device of FIG. 8, the fitting is externally swaged onto to the hose using the correct swaging die. In the case of the device of FIG. 9, internal expansion is not required: only external swaging. In both devices, the amount of swaging (i.e., the actual compression of the ferrule onto the hose) must be carefully controlled so that the corrugations follow the sinusoidal wave-shape of the stem 810, 910 and the ferrule 815, 915 while not distorting the corrugation so that the gaps between the tips of the corrugation (touching the stem 810, 910) disappear. This can be assured by careful manufacture of the fitting to match the dimensions of the hose to be used and carefully controlling the dies (size and speed of the swage) used in the swaging operation. All part of the instant method.

Figure 10:
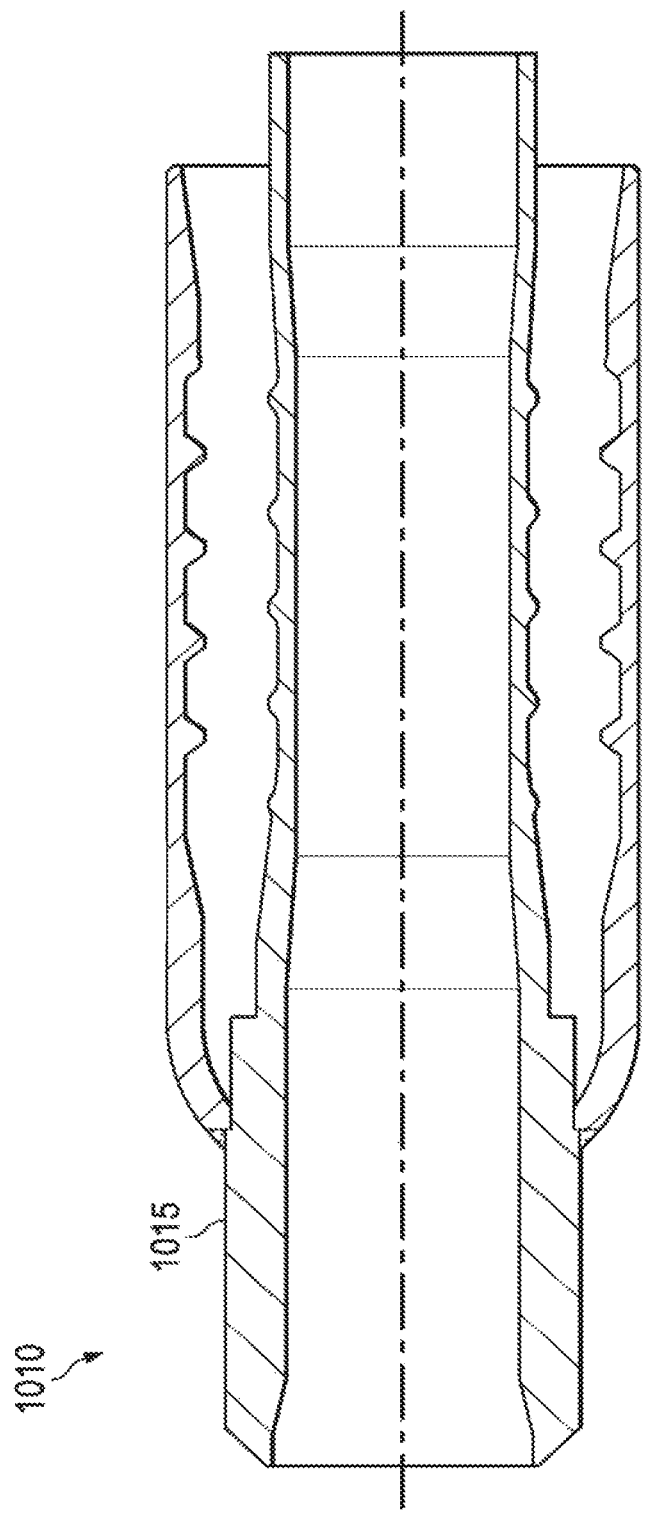
FIG. 10 shows a swage fitting without grippers and with internal expansion.
Figure 11:
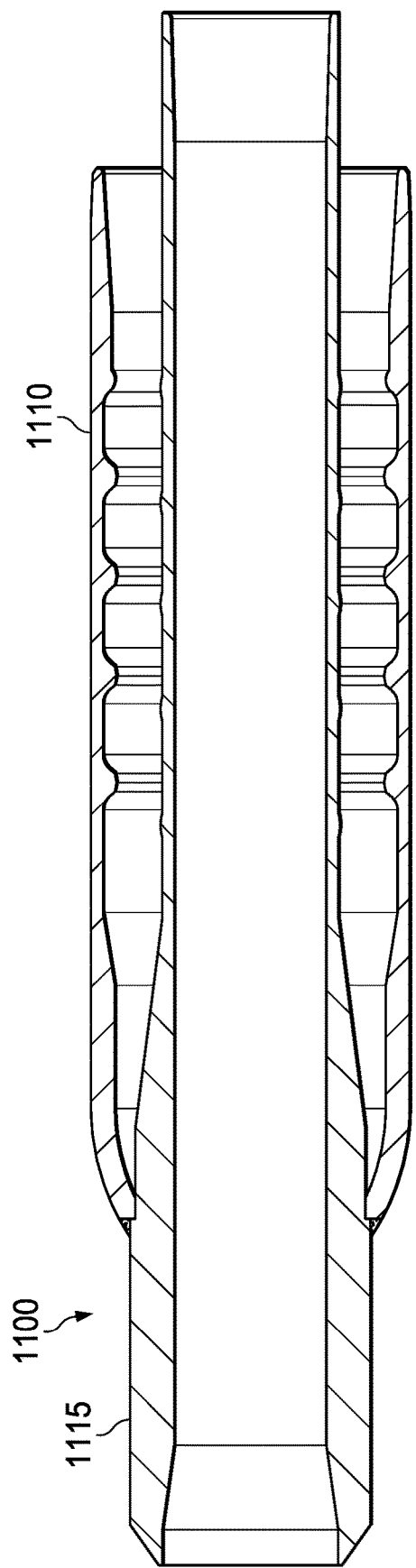
FIG. 11 shows a swage fitting without grippers and without internal expansion.

Further alternate embodiments, without internal grippers, are shown in FIGS. 10 and 11 based on the original sine-wave lock patent by Baldwin et al. In particular FIG. 10 shows a specialized hose coupling 1010 designed for use with internal expansion and then with external swaging. The stem 1015 is slightly less in internal diameter than the rest of the stem. Internal expansion forces the two internal diameters to be the same. The coupling is fully described in U.S. Pat. No. 7,338,090. FIG. 11 shows a similar specialized hose coupling 1100 which does not require internal expansion. This coupling is more fully described in U.S. Patent Application Publication US 2011/0272943: being similar to WO 2010/098833. Both couplings require careful pre-swaging preparation of the metal lined hose. The external part of the hose is skived to also expose the reinforcement which will lie between the ferrule 1110 and the stem 1115, terminating about 1-inch within the fitting when the hose is placed within the fitting.

In the case of a corrugated hose used in the fittings of FIG. 10, and after the hose is properly prepared, the hose is positioned within the fitting 1010 and the stem 1015 internally expanded as the first step in attaching the hose coupling 1010 to the hose.

For the second step involving the device of FIG. 10, the fitting swaged onto to the hose. In the case of the device of FIG. 11, internal expansion is not required: only external swaging. In both devices, the amount of swaging (i.e., the actual compression of the ferrule 1110 onto the hose) must be carefully controlled so that the corrugations follow the sinusoidal wave-shape of the stem 1115 and the ferrule 1110 while not distorting the corrugation so that the gaps between the tips of the corrugation (touching the stem 1115) disappear. This can be assured by careful manufacture of the fitting to match the dimensions of the hose to be used and carefully controlling the dies used in the swaging operation. All part of the instant method.

Figure 12:
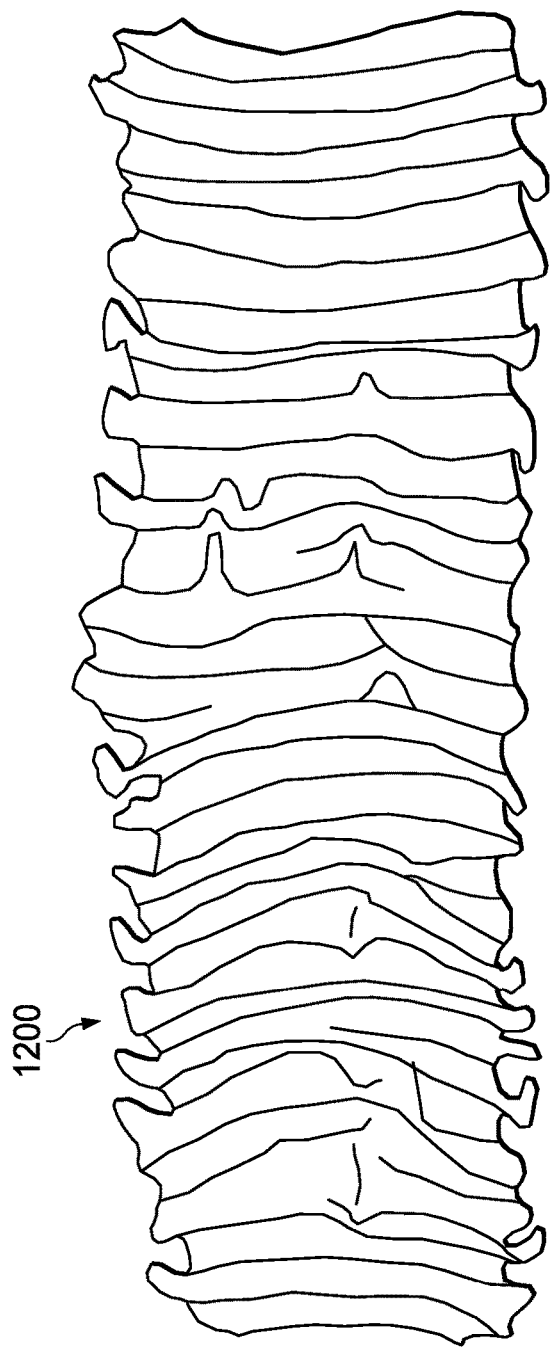
FIG. 12 shows the collapsing of the corrugations of the inner tube when swaged onto the stem of the first iteration which led to the second iteration.

During testing of the first iteration of the preferred hose assembly (using the device shown in FIGS. 8, 13, and 14 with a corrugated metal lined hose), it was found that the metal corrugations 1200 collapsed thereby destroying the expected labyrinth seal between the metal liner and the fitting as shown in FIG. 12 after the fitting was swaged onto the hose. This effect was discovered when the hose assembly was cut open, in cross-section within one of the end connectors, to expose the area of the end connector between point "A" and the hose end (see FIG. 8) after the hose assembly failed to meet test pressures because it leaked in the end connectors. Thus, some technique was needed to support the corrugations during the swaging operation.

The inventors decided that a series of rubber rings (the term rubber is used generically to include any type of elastomer such a rubber, plastic, nylon, etc.) which would fit inside the corrugations might offer a solution to preventing the collapse of the corrugations. At the time that this decision was made, it was believed that the rubber rings would lend support to the corrugations and perhaps they would further aid in sealing the metal liner to the stem. As explained in this disclosure, this decision was the "stroke of genius" needed.

Therefore, in the second iteration of the preferred instant invention a series of elastomeric rings were inserted into the corrugations of the metal lined hose which corresponds to the distance between D and F as shown in FIG. 8. (This technique will work in the alternate embodiment device shown in FIG. 9, as well in FIGS. 10 and 11.) This is clearly shown in FIG. 18 with the resulting swage operation shown in FIG. 19.

The Preferred Embodiment for Corrugated Inner Tubes

Figure 13:
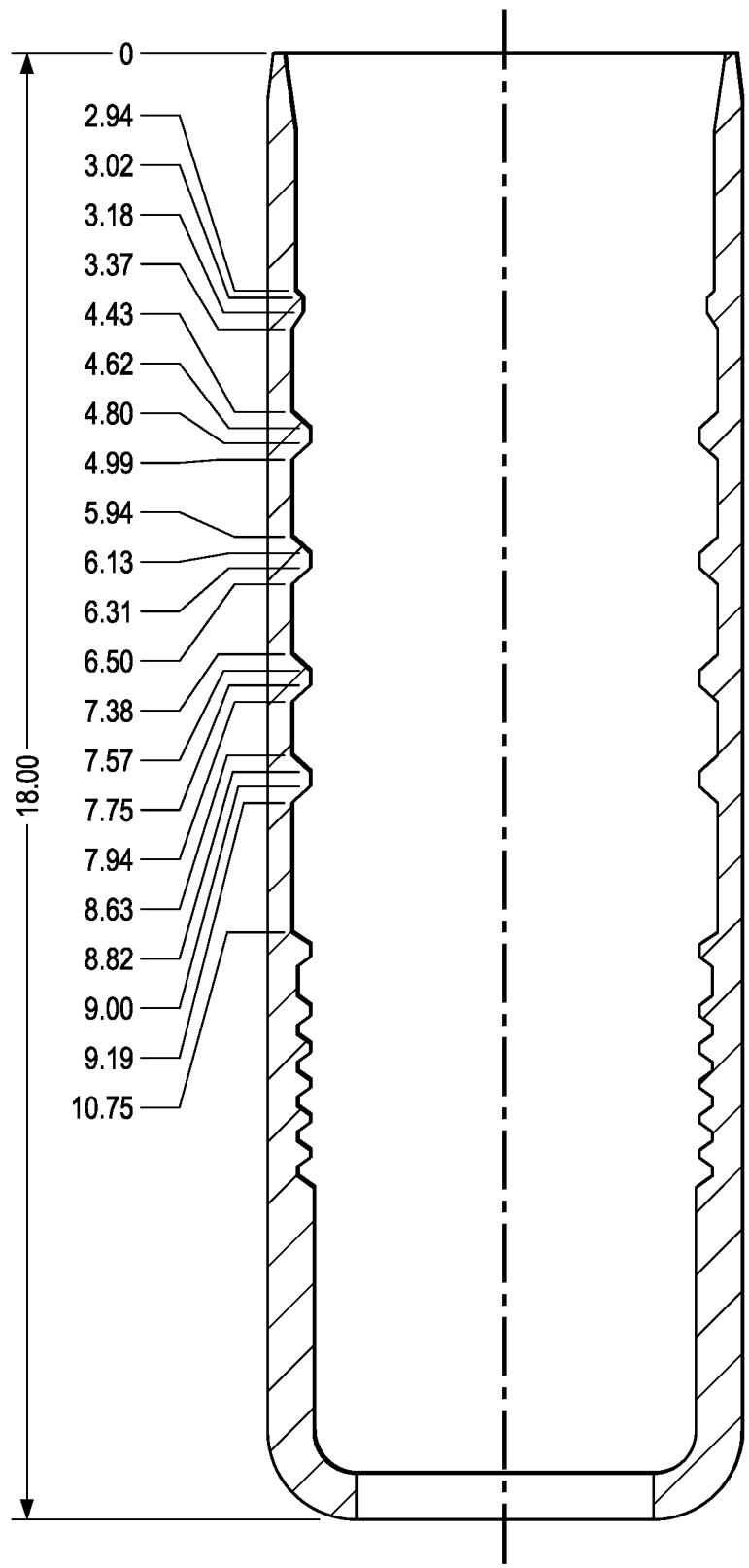
FIG. 13 shows the Ferrule of the prototype swage fitting of the second and third iterations of the instant invention.
Figure 17:
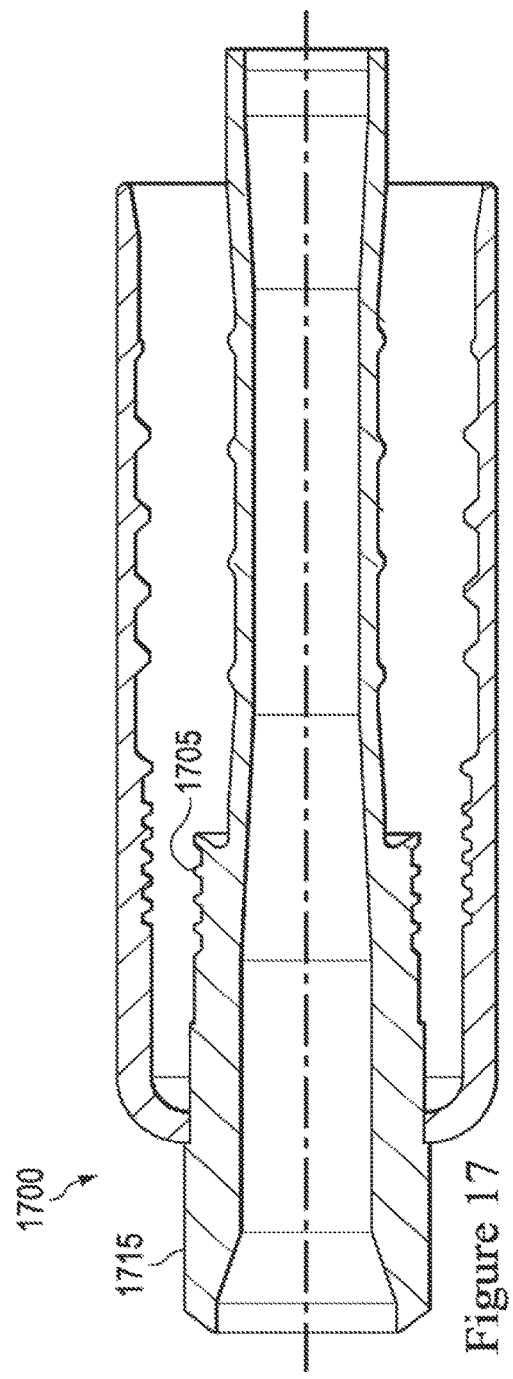
FIG. 17 shows the complete High Pressure/Temperature End Connector fitting of the second iteration of the instant invention.
Figure 18:
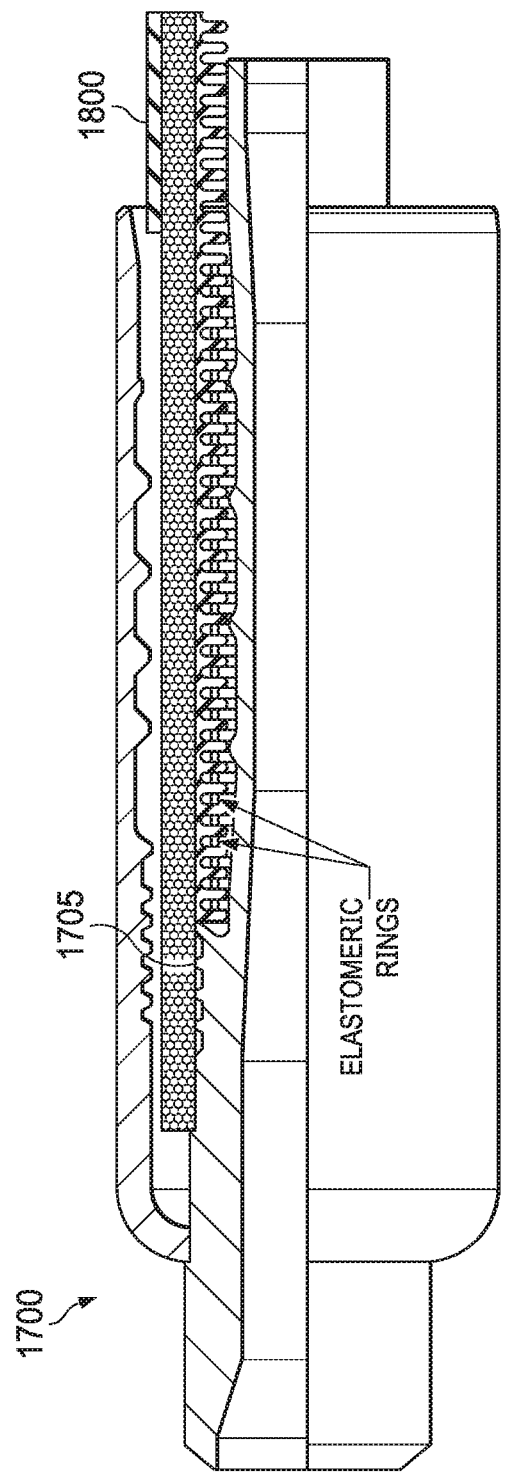
FIG. 18 is an illustration of the swage fitting incorporating the second iteration of the instant invention being placed on the reinforced hose.
Figure 19:
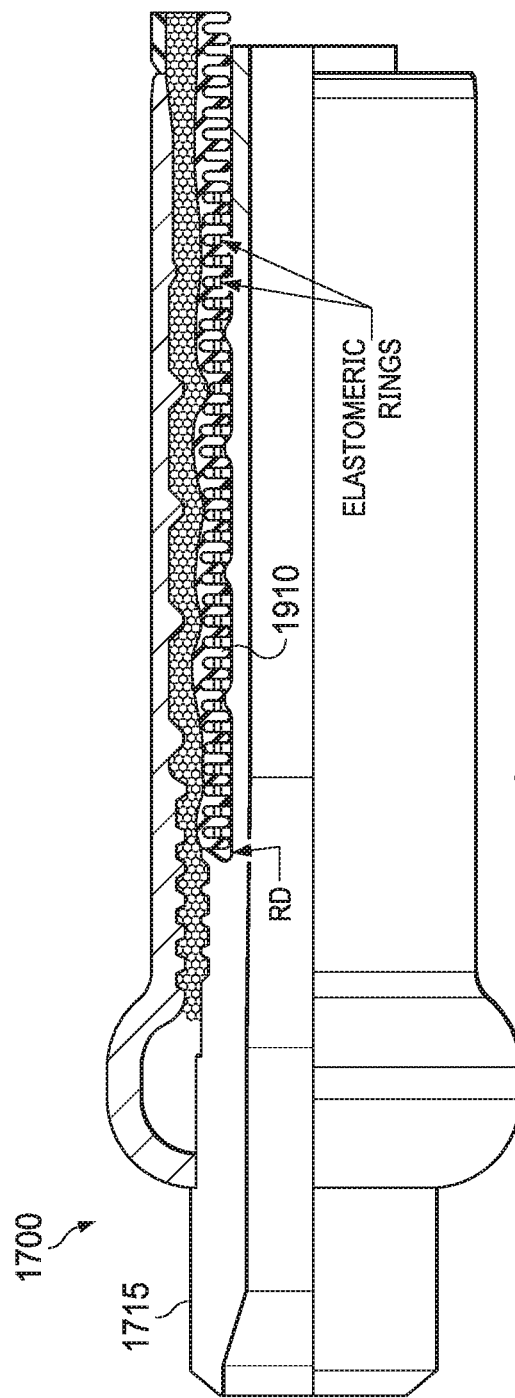
FIG. 19 is an illustration of the swage fitting incorporating the second iteration of the instant invention in place on the reinforced hose.

The preferred second iteration of the specialized fitting, which uses internal expansion followed by external swaging, is shown in FIGS. 13, 14, and 17-19. The double step swaging operation is shown in FIGS. 18 and 19. FIGS. 13 and 14 show the specialized end connector fitting that has a surface roughness in the range of 250-16 micro-inches where the stem comes into contact with the metal corrugations and the elastomeric rings. Other ranges of surface roughness can be found between 1000-250 micro-inches. The complete fitting is shown in FIG. 17.

In the case of a corrugated hose used in the fittings of FIG. 8, and after the hose is properly prepared (the double skiving and placement of elastomeric rings inside the corrugations), the hose is positioned within the fitting so that the inner tube and inner rubber are positioned firmly against the rubber dam, RD, and the stem internally expanded as the first step in attaching the hose coupling to the hose.

For the second step involving the preferred device of FIG. 8, the fitting is swaged onto to the hose. In the case of the alternate device of FIG. 9, internal expansion is not required: only external swaging. In both devices, the amount of swaging (i.e., the actual compression of the ferrule onto the hose) must be carefully controlled so that the corrugations follow the sinusoidal wave-shape formed between and by the stem and the ferrule while not distorting the corrugation so that the gaps between the tips of the corrugation (touching the stem) disappear. This can be assured by careful manufacture of the fitting to match the dimensions of the hose to be used and carefully controlling the dies used in the swaging operation. All part of the instant method.

When the swaging operations are complete the hose coupling 1700 will come to rest with the grippers 1705 in firm contact with the reinforcement and the metal corrugation 1910 forming a labyrinth seal between itself and the stem 1715 of the fitting as shown in FIG. 19. The inner tube and inner rubber 1615 will be found firmly against the rubber dam, RD, which prevents oozing of rubber into the end connector from the hose 1800; thus, aiding the sealing process.

Figure 20:
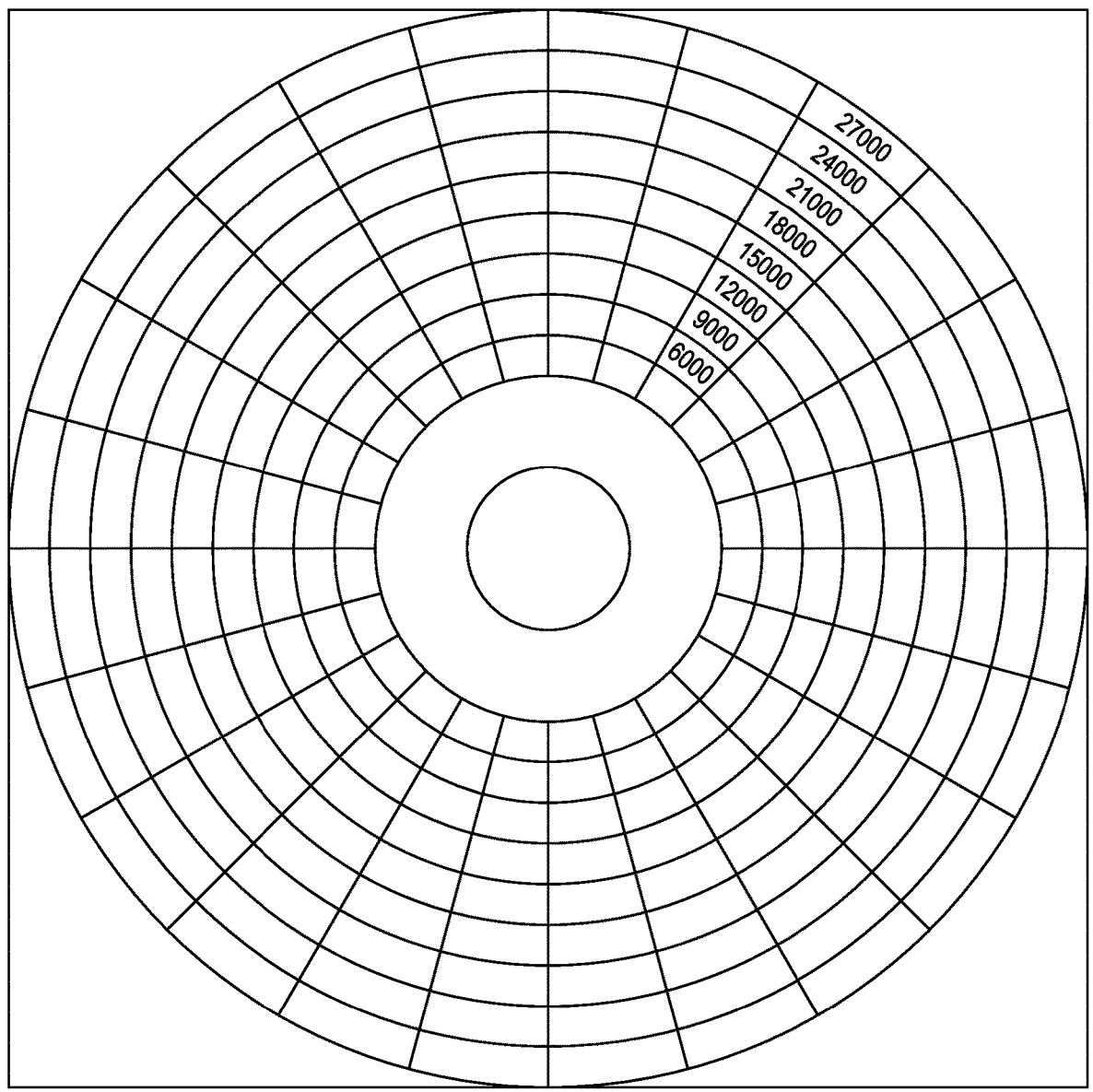
FIG. 20 is the test chart for the prototype hose assembly incorporating the second iteration of the instant invention which attained a burst pressure of 24,300 psi.

In early November 2012, the second iteration of the hose assembly was tested in the laboratory. The resulting test chart is shown in FIG. 20 and a tabular result is shown in FIG. 21. The hose assembly was tested to burst pressure. The fittings at each end of the hose assembly held and did not leak throughout the successful test. The hose burst at 24,200 psi: this is slightly shy of 2,000 psi above the minimum API requirement for choke and kill hoses.

Thus, there is now available to the industry a specialized end connector fitting and hose assembly which meets and exceeds the API standard for choke and kill hoses using a corrugated metal (or other material such as plastic or nylon, etc.) lined reinforced rubber hose and specialized fittings and method of attachment thereby forming a stationary labyrinth seal between the inner tube and the stem of the fitting.

The Embodiments for Smooth Inner Tubes

In a similar manner the inventors considered the latest trend in C&K hose manufacture in which the manufacturers are trying to use a dense plastic, nylon, or similar material (or in some cases a far thicker inner tube or smooth thin wall stainless steel) in the hope of obtaining a smooth inner tube which is impervious to the migration of entrained gases from the fluid contained by the reinforced hose into the liner and the inner rubber membrane of the hose. (Manufacturers know that it is easier and cheaper to produce reinforced hose using a smooth liner over a corrugated liner.)

The problem that presented itself to the inventors after a series of test runs using smooth (and thicker) inner tubes was to make a 'tight seal' between the liner and the swaged end connector. (The problem of retaining the hose had been solved using the grippers, internal rubber dam, and sinusoidal lock as described for the corrugated embodiment earlier.) In the series of tests conducted using the corrugated fitting, it was found that gas leaked past the region of the inner tube where it was in contact with the stem. Based on these experimental results, and the excellent performance obtained with the second iteration of the corrugated metal lined hose, the inventors proposed the use of a labyrinth seal between the smooth inner tube and the stem.

Thus, the devices of FIGS. 15A and 15B were envisioned as the third and fourth iterations of the instant device leading to further embodiments, including the second preferred embodiment. (In fact, the original Baldwin et al. devices described in U.S. Pat. No. 7,338,090 and in WO 2010/098833 may be modified to use the methods disclosed and such modification is anticipated and claimed by this disclosure.) The device used by this method requires a substantial modification of the Baldwin et al. fittings. As shown in FIGS. 15A and 15B, a plurality of O-ring grooves 1505 is formed in the stem 810, 910 of FIG. 8 or 9 during manufacture. (This same technique applies to FIG. 10 or 11.) The ferrule 815, 915 is attached to the stem 810, 910 resulting in end connectors as shown in FIGS. 8-11, except now having O-ring grooves in the stem 810, 910 (see FIG. 15).

The methods of attachment are similar to the methods explained for the embodiments for corrugated hose which result in the same stationary labyrinth seal between the smooth inner tube and the stem of the fitting. In the case of the fittings using internal grippers and a rubber dam, the hose is both internally and externally skived (as explained) to expose the reinforcement. Elastomeric rings having the proper strength and temperature characteristics (such as based on generic nitrile or the DuPont® material Kalrez®) are positioned in the O-ring grooves of the stem. Proper lubrication may be applied to the stem and O-rings and/or to the inner tube of the hose to ensure continued positioning of the O-rings, and the hose is inserted into the fitting. Again the inner tube and inner rubber come to rest against the rubber dam, RD. In the case of the preferred second embodiment, the fitting is internally expanded and then externally swaged. In the case of the alternate second embodiment, the fitting is only externally swaged. Similarly, the fittings that do not use internal grippers may be attached to the hose.

Thus, there is now available to the industry a specialized end connector fitting and hose assembly which is capable of meeting and exceeding the API standard for choke and kill hoses using a smooth plastic, nylon, or similar material lined reinforced rubber hose and specialized fittings and method of attachment thereby forming a stationary labyrinth seal between the inner tube and the stem of the fitting.

We claim:

1. A high pressure reinforced hose assembly, comprising:
an end connector, comprising:
a stem having a coupler end and a hose receiver end and having an inner surface that forms a fluid passageway for a liquid received from a hose and having an outer surface, the stem having a first plurality of hose grippers extending from and along a length of the outer surface between a rubber dam formed on the outer surface of the stem and the coupler end;
a ferrule attached to the stem adjacent the coupler end and having an inner surface that has a second plurality of hose grippers extending from and along a length of the inner surface and that opposes the outer surface of the stem, the second plurality of hose grippers extending at least to the rubber dam and forming an overlapping gripping pattern with the rubber dam; and
a cavity located between the outer surface of the stem and the inner surface of the ferrule and extending along a length of the end connector, the cavity configured to receive an end of a reinforced hose therein;
a section of high pressure reinforced hose having first and second ends, an innermost liner comprising a corrugated surface, and one or more reinforcement layers located over the innermost liner, the first end being received within the cavity such that the innermost liner engages elastomeric sealing members and the rubber dam contacts the innermost liner, and the first and second plurality of hose grippers engage the one or more reinforcement layers; and
wherein the elastomeric sealing members are located in corrugations of the corrugated surface of the innermost liner of the high pressure reinforced hose such that the corrugations are not distorted when the end connector is attached to the section of the high pressure reinforced hose.

2. The high pressure reinforced hose assembly recited in claim 1 wherein the sealing members are elastomeric rubber rings.

3. The high pressure reinforced hose assembly recited in claim 1, wherein the elastomeric sealing members are located between the rubber dam and the hose receiver end.

4. The high pressure reinforced hose assembly recited in claim 1, wherein the rubber dam is formed in the outer surface of the stem nearer the coupler end than the hose receiver end, and wherein the second plurality of hose grippers extend beyond the rubber dam.

* * * * *